US008232925B2

(12) United States Patent
Knudsen et al.

(10) Patent No.: US 8,232,925 B2
(45) Date of Patent: Jul. 31, 2012

(54) IMPEDANCE TUNING OF TRANSMITTING AND RECEIVING ANTENNAS

(75) Inventors: Mikael Bergholz Knudsen, Gistrup (DK); Peter Bundgaard, Aalborg (DK); Jan-Erik Mueller, Ottobrunn (DE); Gert F Pedersen, Storvorde (DK); Mauro Pelosi, Picinisco (IT)

(73) Assignee: Intel Mobile Communications GmbH, Neubiberg (DE)

( * ) Notice: Subject to any disclaimer, the term of this patent is extended or adjusted under 35 U.S.C. 154(b) by 550 days.

(21) Appl. No.: 12/475,366

(22) Filed: May 29, 2009

(65) Prior Publication Data

US 2010/0302106 A1 Dec. 2, 2010

(51) Int. Cl.
*H01Q 1/24* (2006.01)
(52) U.S. Cl. ........................................................ 343/702
(58) Field of Classification Search .................. 343/702, 343/850, 853, 860; 455/283
See application file for complete search history.

(56) References Cited

U.S. PATENT DOCUMENTS

| | | | | |
|---|---|---|---|---|
| 5,969,681 A | * | 10/1999 | O'Neill, Jr. ............ | 343/700 MS |
| 6,674,411 B2 | * | 1/2004 | Boyle ......................... | 343/860 |
| 6,933,893 B2 | * | 8/2005 | Rubinshteyn et al. . | 343/700 MS |
| 7,379,714 B2 | * | 5/2008 | Haque et al. ................. | 455/107 |
| 7,961,668 B2 | * | 6/2011 | Hovers et al. ................ | 370/328 |

OTHER PUBLICATIONS

Chebihi, Anissa et al., "A Novel Isolation Technique for Closely Spaced PIFAs for UMTS Mobile Phones", IEEE Antennas and Wireless Propagation Letters, vol. 7, 2008, pp. 665-668.
Diallo, C. Luxey, P. Le Thuc, R. Staraj, G. Kossiavas, "Enhanced Diversity Antennas for UMTS Handsets", IWAT, Cambridge, Mar. 21-23, 2007.
Pelosi, M. et al., "A Grip Study for Talk and Data Modes in Mobile Phones", IEEE Transactions on Antennas and Propagation, vol. 57, No. 4, Apr. 2009, pp. 856-865.
Pelosi, M. et al., "Influence of dielectric loading on PIFA antennas in close proximity to user's body", Electonic Letters, Feb. 26, 2009, vol. 45, No. 5, 2 pages.
Pelosi, M. et al., "User's Impact on PIFA Antennas in Mobile Phones", 4 Pages.
Pelosi, Mauro; Ondrej, Franek; Pedersen, Gert F.; Knudsen, Mikael, "User's Impact on PIFA Antennas in Mobile Phones," Vehicular Technology Conference, 2009. VTC Spring 2009. IEEE 69th , vol., No., pp. 1-5, Apr. 26-29.

* cited by examiner

*Primary Examiner* — Huedung Mancuso
(74) *Attorney, Agent, or Firm* — SpryIP, LLC

(57) ABSTRACT

The present disclosure relates to impedance tuning of transmitting and receiving antennas.

18 Claims, 8 Drawing Sheets

IMPEDANCE TUNING OF TRANSMITTING AND RECEIVING ANTENNAS

BACKGROUND

Wireless communication systems, such as UTRAN (universal mobile telecommunications systems (UMTS) terrestrial radio access network) and code divisional multiple access (CDMA) 2000, provide full duplex communications, where the transmitter and receiver of a wireless communication device may be active at the same time. Typically, duplex communication systems utilize a pair of separate dedicated frequency bands for transmitting and receiving signals. Additionally, a wireless communication device transmitting and receiving signals utilizing multiple pairs of frequency includes a separate transmitting branch and receiving branch for each pair of frequency bands utilized.

In many instances, noise in a particular receive band is generated by transmission signals. Each transmitting branch may include a duplex filter to filter the noise from the transmission signals in the receive band. In a particular example, a tri-band wireless communication device includes three duplex filters that each filter noise caused by transmission signals of a respective transmitting band from a corresponding receive band. Further, carrier signals transmitted from an antenna of a wireless communication device in a particular band can jam a receiver device of a transceiver due to the strength of the carrier signal. Consequently, each receiving branch includes a filter to decrease the strength of the transmitted signal and reduce the effect of the transmitted signal on the receiver device.

In addition, to the filtering components in the transmitting branch and receiving branch for each pair of frequency bands, a wireless communication device may include additional components for each band. For example, each transmitting branch of a wireless communication device may include a power amplifier and a high-pass filter and each receiving branch may include a low noise amplifier. Further, the transceiver of a wireless communication device may include further components for each band utilized by the wireless communication device, such as a power amplifier for each transmitting branch and a low noise amplifier for each receiving branch. The transceiver may also include additional mixing circuitry for the transmitting and receiving branches based on the number of power amplifiers and low noise amplifiers included in the transceiver. A switch is also utilized to direct signals of each band of a wireless communication device to the proper transmitting branch or receiving branch. Therefore, as the number of bands utilized by a wireless communication device increases, the number of components of the wireless communication device also increases. An increased number of components results in a higher cost of the wireless communication device, increased size, and increased power consumption to achieve sufficient power output.

BRIEF DESCRIPTION OF THE DRAWINGS

The detailed description is described with reference to the accompanying figures. In the figures, the left most digit(s) of a reference number identifies the figure in which the reference number first appears. The use of the same reference numbers in different figures indicates similar or identical items.

DETAILED DESCRIPTION

The disclosure is directed to providing impedance tuning of separate transmitting and receiving antennas. In one implementation, a device includes a transceiver, a transmitting narrowband antenna, and a receiving narrowband antenna. The device also includes a transmitting tuning circuit coupled to the transmitting narrowband antenna and a receiving tuning circuit coupled to the receiving narrowband antenna. The transmitting tuning circuit matches an impedance of the transmitting narrowband antenna with an impedance of a transmitting amplifier, such as a power amplifier, of a transmitting branch and the receiving tuning circuit matches an impedance of the receiving narrowband antenna with the impedance of a receiving amplifier, such as a low noise amplifier, of a receiving branch. In some implementations, the transmitting amplifier and the receiving amplifier may be included in a transceiver coupled to the transmitting branch and the receiving branch. The transmitting and receiving narrowband antennas may also include a number of tuning elements to further match the impedance of the respective antennas with the impedance of the transmitting amplifier and the receiving amplifier.

Some isolation between signals of a transmitting band and a receiving band may be achieved by utilizing separate transmitting and receiving antennas. Further isolation between signals of a transmitting band and a receiving band may be achieved by utilizing transmitting and receiving tuning circuits and/or tuning elements, such that the transmitting antenna can transmit signals via a very narrow range of transmitting frequencies and the receiving antenna can transmit signals via a very narrow range of receiving frequencies. In a particular implementation, the pass band of signals transmitted from a transmitting antenna does not overlap with the pass band of signals received via the receiving antenna. In this way, adequate isolation can be achieved between multiple transmitting bands and multiple receiving bands using one transmitting branch and one receiving branch. Thus, the number of components included in the wireless communication device decreases and the monetary costs and current consumption correspondingly decrease.

Figure 1:
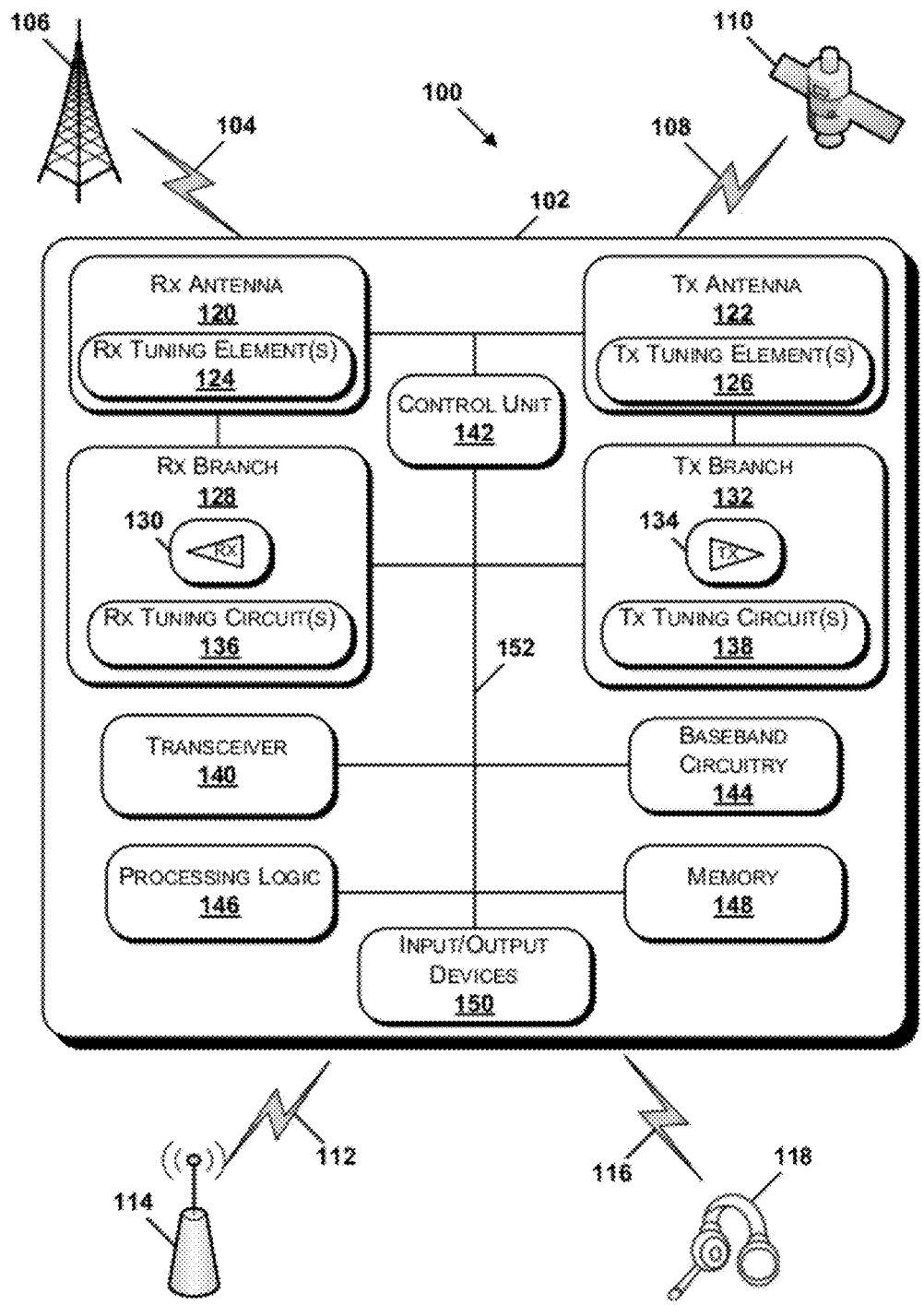
FIG. 1 shows an exemplary system to provide impedance tuning of separate transmitting and receiving antennas.

FIG. 1 shows an exemplary system to provide impedance tuning of separate transmitting and receiving antennas. The system 100 includes a wireless communication device 102 that is configured to transmit wireless signals to, and receive wireless signals from one or more external devices. The wireless signals may include voice traffic, data, control information, or any combination thereof. The wireless communication device 102 may be implemented in any number of ways, including as a smart phone, a hand-held computing device (e.g., a personal digital assistant (PDA)), a mobile telephone, a media playing device, a portable gaming device, a personal computer, a laptop computer, another suitable wireless communication device, or any combination thereof.

In one implementation, the wireless communication device 102 may transmit and/or receive wireless signals 104 via a base station 106. The base station 106 may be included in a wide area wireless communication network, such as a global system for mobile communications (GSM) network, a UMTS network, a CDMA network, a high speed packet access (HSPA) network, a general packet radio service (GPRS) network, an enhanced data rates for GSM evolution (EDGE) network, a worldwide interoperability for microwave access (WiMAX) network, a time division multiple access (TDMA) network, a frequency division multiple access (FDMA) network, a long term evolution (LTE) network, or any combination thereof.

In another implementation, the wireless communication device 102 may transmit and/or receive wireless signals 108 via a communication satellite 110. Further, the wireless communication device 102 may transmit and/or receive wireless signals 112 via a wireless access point 114. The wireless access point 114 may be included in a wide area wireless network or a wireless local area network, such as a Bluetooth network or an Institute of Electrical and Electronics Engineers (IEEE) 802.11 protocol network. Additionally, the wireless communication device 102 may transmit and/or receive wireless signals 116 via a headset 118, such as a Bluetooth headset.

In a particular implementation, the wireless communication device 102 includes a receiving antenna 120 and a transmitting antenna 122. The antennas 120, 122 may be placed in various locations of the wireless communication device 102, such as a bottom portion or a top portion of the wireless communication device 102. In some implementations, the antennas 120, 122 may be very small, such as a microstrip antenna. For example, the antennas 120, 122 may include a planar inverted F antenna (PIFA) or a folded inverted conformal antenna (FICA). The size of the antennas 120, 122 may be reduced by coupling the small antennas 120, 122 to a high permittivity dielectric substrate. Further, the size of the antennas 120, 122 may also be reduced by increasing the quality factor (Q) of the antennas 120, 122. For example, the quality factor of the antennas 120, 122 may be increased by lowering the building height of the antennas 120, 122. In another example, the quality factor of the antennas 120, 122 may be increased by adding ceramic materials to the antennas 120, 122. By utilizing separate antennas for transmitting and receiving signals, some isolation is achieved between transmitting and receiving frequency bands.

Additionally, the antennas 120, 122 may cover a narrow band of frequencies at a given time. In particular, the band of frequencies covered by the antennas 120, 122 during a communication session may be less than the entire range of frequencies covered by signals transmitted and received according to a particular wireless communication technology. For example, the wireless communication device 102 may be configured to transmit signals according to the UMTS wireless communication technology in a range of 1920-1980 MHz. However, at any given time, the antennas 120, 122 may transmit signals within one or more channels having a range of 3.84 MHz each.

The frequency of signals received and transmitted by the antennas 120, 122 depends on a particular resonant frequency of the antennas 120, 122. In some implementations, the antennas 120, 122 are multi-band antennas that are tuned to different resonant frequencies. For example, the receiving antenna 120 may be tuned to a first resonant frequency while receiving signals of a particular wireless communication technology and the receiving antenna 120 may be tuned to a second resonant frequency while receiving signals of a different wireless communication technology. In another example, the transmitting antenna 122 may be tuned to a first resonant frequency to transmit signals via a particular wireless communication technology and the transmitting antenna 122 may be tuned to a different resonant frequency while transmitting signals via a different wireless communication technology.

The receiving antenna 120 may include one or more receiving tuning elements 124 and the transmitting antenna 122 may include one or more transmitting tuning elements 126. The receiving tuning elements 124 and the transmitting tuning elements 126 may alter the resonance frequency of the antennas 120, 122 by changing the electrical structure of the antennas 120, 122. In this way, a single antenna can be used to receive or transmit signals via a number of different frequency ranges while minimizing mismatch loss and/or absorption loss.

In a particular example, the tuning elements 124, 126 may be coupled directly to radiating elements of the respective antennas 120, 122. In another example, the tuning elements 124, 126 may be placed in signal carrying paths coupled to the antennas 120, 122. Additionally, the tuning elements 124, 126 may be coupled between the antennas 120, 122. In one implementation, the tuning elements 124, 126 include radio frequency (RF) based switches coupled to one or more capacitors, one or more inductors, or a combination thereof. In another implementation, the tuning elements 124, 126 include tunable capacitors, such as microelectromechanical system (MEMS) capacitors.

In addition, the wireless communication device 102 includes a receiving branch 128 coupled to the receiving antenna 120. The receiving branch 128 may include a number of components, such as a receiving amplifier 130, to process signals received by the receiving antenna 120. In some implementations, the receiving amplifier 130 is a low noise amplifier. The receiving branch 128 may also include a number of additional components, such as one or more switches, one or more filters, or a combination thereof. Further, the receiving branch 128 may include one or more additional low noise amplifiers. The wireless communication device 102 also includes a transmitting branch 132 coupled to the transmitting antenna 122. The transmitting branch 132 may include a number of components, such as the transmitting amplifier 134, to process signals transmitted by the transmitting antenna 122. In some implementations, the transmitting amplifier 134 is a power amplifier. The transmitting branch 132 may also include additional components, such as one or more switches, one or more filters, such as duplex filters, or a combination thereof. Further, the transmitting branch 132 may include one or more additional power amplifiers.

Further, the receiving branch 128 may include one or more receiving tuning circuits 136 and the transmitting branch 132 may include one or more transmitting tuning circuits 138. The receiving tuning circuits 136 may match an impedance of the receiving antenna 120 with an impedance of the receiving amplifier 130, while the transmitting tuning circuits 138 may match an impedance of the transmitting antenna 122 with the impedance of the transmitting amplifier 134. The impedance matching performed by the tuning circuits 136, 138 may be in addition to the impedance tuning achieved via the tuning elements 124, 126. In some implementations, the receiving tuning circuits 136 are coupled to the receiving amplifier 130 and the transmitting tuning circuits 138 are coupled to the transmitting amplifier 134.

The wireless communication device 102 includes a transceiver 140 coupled to the receiving branch 128 and the transmitting branch 132. In some instances, the transceiver 140 is coupled to the receiving amplifier 130 and the transmitting amplifier 134. In alternative implementations, the receiving amplifier 130 and/or the transmitting amplifier 134 are included in the transceiver 140 rather than the receiving branch 128 and the transmitting branch 132. The transceiver 140 is configured to process signals to be transmitted and to process signals received via one or more respective wireless communication technologies. In some implementations, the receiving tuning circuits 136 and the transmitting tuning circuits 138 may be included in circuitry of the transceiver 140. Although only one transceiver is shown in FIG. 1, the wireless communication device 102 may include multiple transceivers coupled to the receiving branch 128 and the transmitting branch 132.

In some implementations, the impedance of the receiving amplifier 130 is relatively stable and the impedance of the transmitting amplifier 134 is also relatively stable. For example, the impedance of the receiving amplifier 130 and transmitting amplifier 134 may be around 50 ohms. The impedance of the receiving antenna 120 may depend on the frequency of a signal received via the receiving antenna 120 and the impedance of the transmitting antenna 122 may depend on the frequency of a signal to be transmitted via the transmitting antenna 122. In addition, the impedance of the antennas 120, 122 may be influenced by interactions between a user of the wireless communication device 102 and the antennas 120, 122 (e.g. a hand of a user covering a portion of one or both of the antennas 120, 122). Matching the impedance of the antennas 120, 122 with the impedance of the receiving amplifier 130 and the transmitting amplifier 134 provides efficient transmission and reception of signals via the antennas 120, 122 by reducing an amount of energy reflected back from a component of the wireless communication device 102 providing the signal (i.e. the antennas 120, 122, the receiving amplifier 130, or the transmitting amplifier 134). The impedance of the receiving antenna 120 with respect to the receiving amplifier 130 and the impedance of the transmitting antenna 122 with respect to the transmitting amplifier 134 may be influenced by additional components of the receiving branch 128 and the transmitting branch 132, respectively, such as one or more signal carrying lines, one or more filters, one or more switches, or a combination thereof.

In an illustrative implementation, when signals are transmitted from the transceiver 140 to the transmitting antenna 122, the transmitting tuning circuits 138, the transmitting tuning elements 126, or a combination thereof, match the impedance of the transmitting amplifier 134 with the impedance of the transmitting antenna 122, such that the impedance of the transmitting antenna 122 with respect to the impedance of the transmitting amplifier 134 is approximately the same. For example, when the impedance of the transmitting amplifier 134 is 50 ohms and the impedance of the transmitting antenna 122 is 65 ohms, the transmitting tuning circuits 138, alone or in combination with the transmitting tuning elements 126, modify the impedance of the transmitting antenna 122 with respect to the transmitting amplifier 134, such that the transmitting antenna 122 appears to have an impedance of 50 ohms with respect to the transmitting amplifier 134. In another illustrative implementation, when signals are received at the receiving antenna 120 from an external device and sent to the transceiver 136 for processing, the receiving tuning circuits 136, the receiving tuning elements 124, or a combination thereof, match the impedance of the receiving amplifier 130 with the impedance of the receiving antenna 120, such that the impedance of the receiving amplifier 130 with respect to the receiving antenna 120 is approximately the same.

In some instances a mismatch between the impedance of the antennas 120, 122 and the impedance of the receiving amplifier 130 or the transmitting amplifier 134 is due to transmitting or receiving a signal that is outside the resonant frequency of the respective antenna 120, 122. For example, when the receiving narrowband antenna 120 switches from receiving signals via a particular frequency band to receiving signals via a different frequency band, the impedance of the receiving antenna 120 may differ from the impedance of the receiving amplifier 130. In response to the impedance mismatch between the receiving antenna 120 and the receiving amplifier 130, the receiving tuning circuits 136, the receiving tuning elements 124, or a combination thereof, match the impedance of the receiving antenna 120 to the impedance of the receiving amplifier 130. In this way, the impedance matching provided by the receiving tuning circuits 136 and/or the receiving tuning elements 124 allow the receiving antenna 120 to efficiently receive signals across a range of frequencies. In a further example, when the transmitting antenna 122 switches from transmitting signals via a particular frequency range to transmitting signals via a different frequency range, the impedance of the transmitting antenna 122 may differ from the impedance of the transmitting amplifier 134. In response to the impedance mismatch between the transmitting antenna 122 and the transmitting amplifier 134, the transmitting tuning circuits 138, the transmitting tuning elements 126, or a combination thereof, match the impedance of the transmitting antenna 122 to the impedance of the transmitting amplifier 134.

Further, absorption loss may affect the impedance of the antenna 120, 122 with respect to the receiving amplifier 130 and/or the transmitting amplifier 134. For example, a user of the wireless communication device 102 may block one or more of the antennas 120, 122 by holding the wireless communication device 102 in a particular manner. When the impedance of the antennas 120, 122 changes due to absorption loss, the corresponding receiving or transmitting tuning elements 124, 126, the corresponding receiving or transmitting tuning circuits 136, 138, or a combination thereof, operate to match the impedance of the antennas 120, 122 with the impedance of the receiving amplifier 130 and/or the transmitting amplifier 134.

The wireless communication device 102 includes a control unit 142. The control unit 142 provides control signals to the tuning elements 124, 126, the tuning circuits 136, 138, or a combination thereof, to match the impedance of the antennas 120, 122 with the impedance of the receiving amplifier 130 and/or the transmitting amplifier 134. For example, the control unit 142 may provide control signals to the tuning elements 124, 126 and/or the tuning circuits 136, 138 to change a state of one or more MEMS capacitors. In another example, the control unit 142 may provide control signals to switches of the tuning elements 124, 126 and/or the tuning circuits 136, 138. The control unit 142 may also receive signals from the transceiver 140 indicating a frequency range of signals sent and received via the antennas 120, 122. In this way, the control unit 142 can determine an impedance of the antennas 120, 122 based on signals transmitted or received at a given time and provide control signals to the tuning elements 124, 126 and/or the tuning circuits 136, 138 to match the impedance of the antennas 120, 122 with the impedance of the receiving amplifier 130 and/or the transmitting amplifier 134.

The control unit 142 may receive a number of inputs from baseband circuitry 144, as well as other sources, that are used when providing control signals to the tuning elements 124, 126 and/or the tuning circuits 136, 138. For example, the baseband circuitry 144 may provide a lowest possible bit error rate to the control unit 142. In another example, the baseband circuitry 144 may provide to the control unit 142, a power control level of a network communicating signals with the wireless communication device 102 in order to minimize the power control level feedback from the network. The baseband circuitry 144 may also provide the forward power at the transmitting antenna 122 for signals transmitted to external devices. The baseband circuitry 144 may also provide the reflected power at the antennas 120, 122 to the control unit 142. Further, the baseband circuitry 144 may provide a use case, such as gaming, talk, handset, to the control unit 142 indicating possible influence of user interaction with the wireless communication device 102. Data from sensors indicating user interaction with certain parts of the wireless communication device 102 may also be provided to the control unit 142 from the baseband circuitry 144, as well as, current consumption. The control unit 142 may also receive a received signal strength indication (RSSI). The control unit 142 processes the inputs received from the baseband circuitry 144 and other sources to optimize the tuning of the impedances of the antennas 120, 122 and the receiving amplifier 130 and the transmitting amplifier 134.

The wireless communication device also includes additional components, such as processing logic 146 and memory 148. The processing logic 146 may include one or more processors and the memory 148 may be is accessible to the processing logic 146. The memory 148 may include read-only memory (ROM), random access memory (RAM), flash memory, a hard disk, or any combination thereof. Additionally, the memory 148 may store one or more applications configured to transmit and/or receive wireless signals. For example, the memory 148 may store an application configured to send and receive wireless signals related to telephone calls, such as voice traffic or control information. In another example, the memory 148 may store an application configured to request and receive website data, an application configured to transmit and receive text messages, an application configured to transmit and receive picture messages, an application configured to transmit and receive video messages, or any combination thereof. The applications stored in the memory 148 may include software instructions, hardware, or any combination thereof.

The wireless communication device 102 also includes one or more input/output devices 150. In an illustrative embodiment, the input/output devices 150 may include a microphone, a speaker, a touchpad display, a cursor control device, such as a mouse, a keypad, or any combination thereof. Additionally, the wireless communication device 102 includes a bus 152 to facilitate the communication of signals between components of the wireless communication device 102 and other components not shown, such as a power supply.

Figure 2:
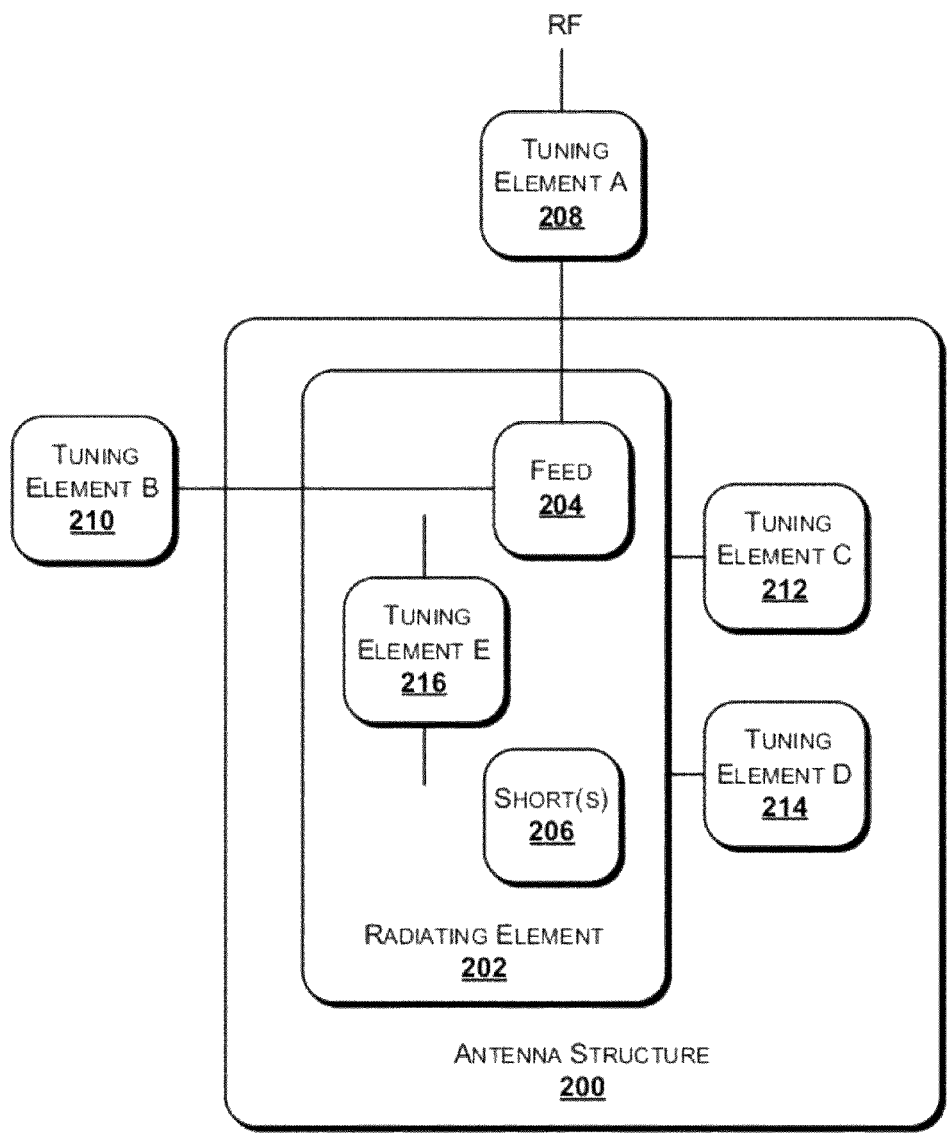
FIG. 2 shows a schematic diagram of an antenna structure with one feed point and a number of tuning elements.

FIG. 2 shows a diagram of an antenna structure 200 with one feed point and a number of tuning elements. The antenna structure 200 may be included in a wireless communication device, such as the wireless communication device 102 of FIG. 1. Additionally, the antenna structure 200 may be decoupled from the chassis of the wireless communication device. In this way, the antenna structure 200 can serve as a standard component of the wireless communication device, such that the antenna structure 200 can be utilized in multiple wireless communication device designs. In some implementations, the antenna structure 200 may be included in the receiving antenna 120 and the transmitting antenna 122 of FIG. 1. Further, the antenna structure 200 may be very small. For example, the antenna structure 200 may be a PIFA coupled to a high permittivity substrate. In addition, the antenna structure 200 may have a high quality factor (Q).

The radiating element 202 may transmit or receive signals via one or more frequency ranges of one or more wireless communication technologies. Additionally, the radiating element 202 may include a feed 204. The feed 204 may be coupled to a number of transceivers, such that the radiating element 202 can transmit or receive signals, RF, via different wireless communication technologies operating in different frequency ranges and/or via different bands of a particular wireless communication technology. In one implementation, the feed 204 is coupled to a transmitting branch, such that the antenna structure 200 can transmit signals from a transceiver via the feed 204. In another implementation, the feed 204 is coupled to a receiving branch, such that the antenna structure 200 can provide signals to the transceiver via a respective feed line. The radiating element 202 also includes one or more shorts 206 that provide a connection between the radiating element 202 and ground. The one or more shorts 206 may provide some impedance tuning between the antenna structure 200 and a transmitting amplifier or a receiving amplifier.

The antenna structure 200 also includes a number of tuning elements. The tuning elements may be coupled to the antenna structure 200 via a signal carrying line, such as the tuning circuits 136, 138 of FIG. 1, or the tuning elements may be directly coupled to the radiating element 202, such as the tuning elements 124, 126 of FIG. 1. In an illustrative implementation, the tuning element A 208 is coupled to the feed 204 and in series with a line carrying the signal RF. In another illustrative implementation, the tuning element B 210 is coupled to the feed 204 and in parallel with a line carrying the signal RF. Additionally, the tuning element C 212 and the tuning element D 214 are coupled directly to the radiating element 202. In some implementations, tuning element C 212 and the tuning element D 214 may be coupled to particular locations on the radiating element 202 to optimize the impedance matching performed by the respective tuning elements and to minimize any interference that the tuning elements 212, 214 may produce. Further, the antenna structure 200 includes a tuning element E 216 coupled between two points on the radiating element. The tuning elements 208-216 alter the resonance frequency of the antenna structure 200 by changing the electrical structure of the antenna structure 200. In this way, a single antenna can be used to receive signals via a number of different frequency ranges while minimizing mismatch loss and while minimizing absorption loss.

The requirements of the tuning elements 208-216 may differ depending on the application of a particular tuning element. For example, in some instances when performing impedance matching due to absorption loss, a tuning element may have a slow reaction time in response to receiving a control signal. In another example, in some instances when performing impedance matching due to mismatch loss caused by changing from transmitting/receiving signals via a particular frequency to transmitting/receiving signals via another frequency, a particular tuning element may need to react quickly to an applied control signal. Additionally, tuning elements placed in a receiving branch may have different requirements from tuning elements placed in a transmitting branch.

In some implementation, the tuning elements 208-216 include one or more switches. For example, the tuning elements 208-216 may include radio frequency (RF) switches. The RF switches may include ohmic and/or capacitive RF MEMS switches, PIN diodes, field effect and/or bipolar based transistor switches, or a combination thereof. In another example, the tuning elements 208-216 may include mechanical switches. The switches are coupled to one or more capacitors and/or one or more inductors, such as a capacitor bank, an inductor bank or a combination thereof. In a particular implementation, the capacitors can be thin film capacitors manufactured in a semiconductor process, a microelectromechanical (MEMS) process, or a combination thereof. In addition, the thin film capacitors can be manufactured in an enhanced package process or a module manufacturing process based on laminate or ceramic material. The capacitors can also be discrete surface mount devices or a combination of discrete surface mount devices and thin film capacitors. By utilizing switches in conjunction with a capacitor bank and/or inductor bank, element values in the bank can be used for impedance tuning in discrete steps. For example, when four capacitive or inductive elements are available in the bank, four bit control is possible. The tuning elements 208-216 may also be tunable capacitor based with the capacitor values controlled by analog voltage. For example, the tuning elements 208-216 may be semiconductor devices, such as varactors and diodes, dielectric based material, or MEMS capacitors.

In an illustrative implementation, switches of the tuning elements 208-216 may be activated in response to receiving a control signal from a control unit in order to open or close. By opening or closing the switches, the state of inductors and/or capacitors coupled to the switches may change. In this way, the impedance of the antenna structure 200 with respect to a transmitting amplifier or a receiving amplifier may change in order to match the impedance of the antenna structure 200 with the impedance of the transmitting amplifier or receiving amplifier. In another illustrative implementation, tunable capacitors of the tuning elements 208-216 may discharge or store current in response to control signals applied by a control unit. By changing the current stored or discharged by the tunable capacitors, the state of the tunable capacitors changes and the impedance of the antenna structure 200 is modified accordingly.

Figure 3:
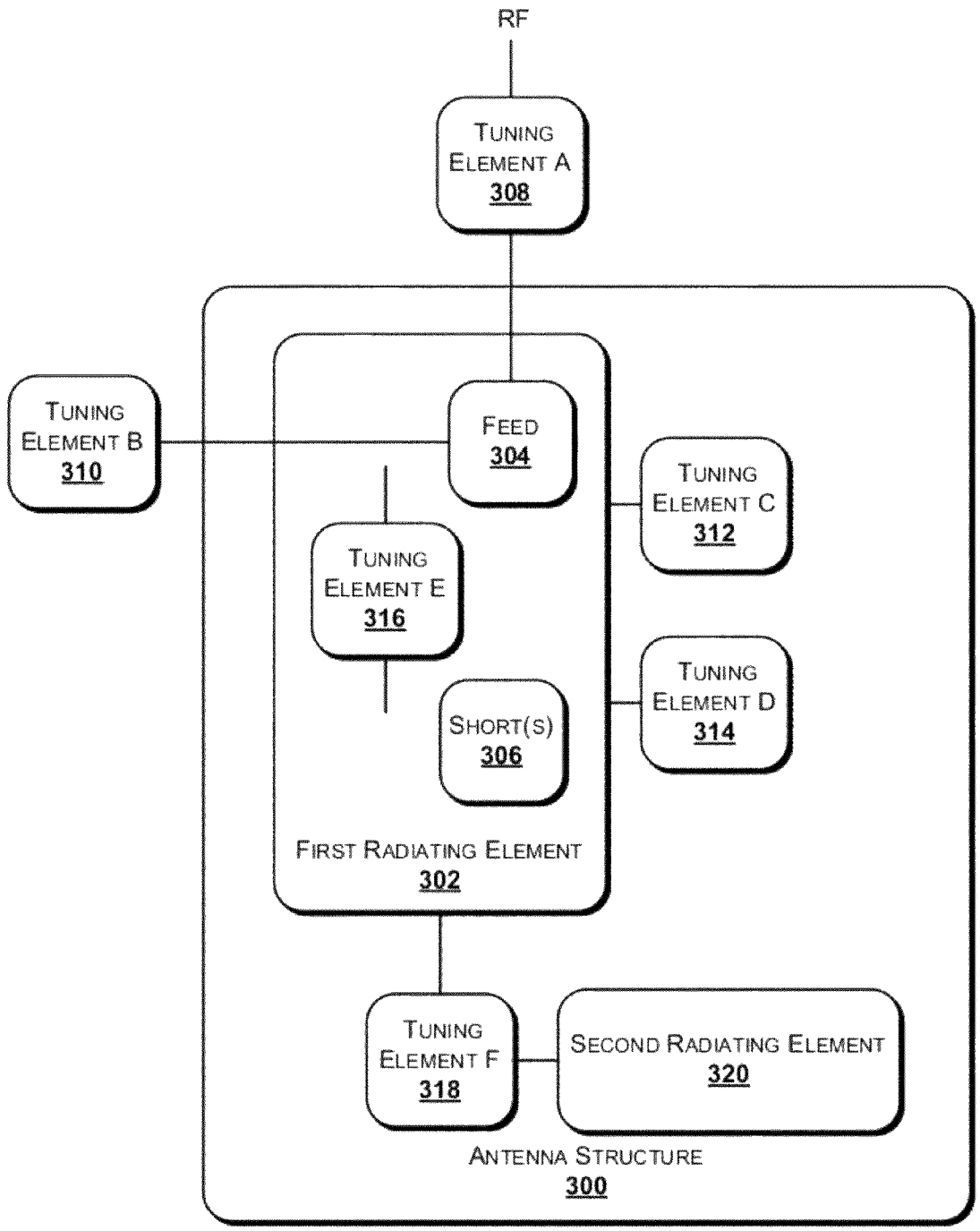
FIG. 3 shows a schematic diagram of an antenna structure with multiple radiating elements and a number of tuning elements.

FIG. 3 shows a schematic diagram of an antenna structure with multiple radiating elements and a number of tuning elements. The antenna structure 300 may be included in a wireless communication device, such as the wireless communication device 102 of FIG. 1. Additionally, the antenna structure 300 may be decoupled from the chassis of the wireless communication device. In this way, the antenna structure 300 can serve as a standard component of the wireless communication device, such that the antenna structure 300 can be utilized in multiple wireless communication device designs. In some implementations, the antenna structure 300 may be included in the antennas 120, 122 of FIG. 1.

The first radiating element 302 may transmit or receive signals via one or more frequency ranges of one or more wireless communication technologies. Additionally, the first radiating element 302 may include a feed 304. The feed 304 may be coupled to a transmitting branch or a receiving branch, such that the first radiating element 302 can transmit or receive signals, RF. The first radiating element 302 may transmit or receive signals via different wireless communication technologies operating in different frequency ranges and/or via different bands of a particular wireless communication technology. In one implementation, the feed 304 is coupled to a transmitting amplifier, such that the antenna structure 300 can transmit signals from a transceiver via the feed 304. In another implementation, the feed 304 is coupled to a receiving amplifier, such that the antenna structure 300 can provide signals to the transceiver via a respective feed line. The first radiating element 302 also includes one or more shorts 306 that provide a connection between the radiating element 302 and ground. The one or more shorts 306 may provide some impedance tuning between the antenna structure 300 and a transmitting amplifier or a receiving amplifier.

The antenna structure 300 also includes a number of tuning elements. The tuning elements may be coupled to the antenna structure 300 via a signal carrying line, such as the tuning circuits 136, 138 of FIG. 1, or the tuning elements may be directly coupled to the first radiating element 302, such as the tuning elements 124, 126 of FIG. 1. In an illustrative implementation, the tuning element A 308 is coupled to the feed 304 and in series with a line carrying the signal RF. In another illustrative implementation, the tuning element B 310 is coupled to the feed 304 and in parallel with a line carrying the signal RF. Additionally, the tuning element C 312 and the tuning element D 314 are coupled directly to the radiating element 302. In some implementations, tuning element C 312 and the tuning element D 314 may be coupled to particular locations on the first radiating element 302 to optimize the impedance matching performed by the respective tuning elements and to minimize any interference that the tuning elements 312, 314 may produce. Further, the antenna structure 300 includes a tuning element E 316 coupled between two points on the radiating element.

The antenna structure 300 also includes a tuning element F 318 coupled to the first radiating element 302 and a second radiating element 320. The second radiating element 320 may transmit or receive signals via one or more frequency ranges that are different from the frequency ranges transmitted and received by the first radiating element 302. Additionally, the second radiating element 320 may include one or more feeds and one or more shorts (not shown). The second radiating element 320 may also be directly coupled to one or more additional tuning elements. The antenna structure 300 may include a notch (not shown) in order to isolate the first radiating element 302 from the second radiating element 320.

Figure 4:
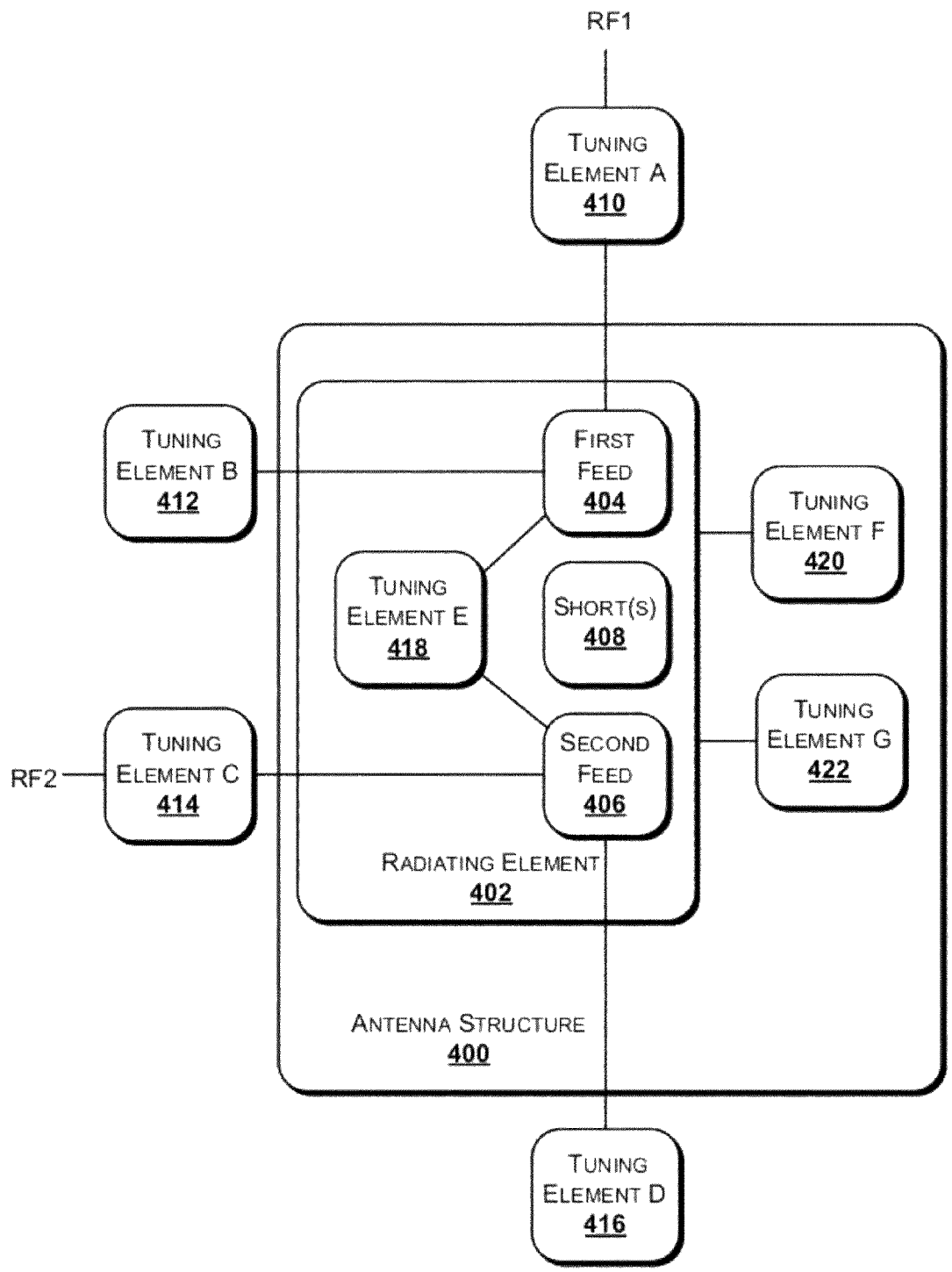
FIG. 4 shows a schematic diagram of an antenna structure with multiple feed points and a number of tuning elements.

FIG. 4 shows a schematic diagram of an antenna structure with multiple feed points and a number of tuning elements. The antenna structure 400 may be included in a wireless communication device, such as the wireless communication device 102 of FIG. 1. In some implementations, the antenna structure 400 may be included in the receiving antenna 120 and the transmitting antenna 122 of FIG. 1.

The radiating element 402 may transmit or receive signals via one or more wireless communication technologies. Additionally, the radiating element 402 may include a first feed 404 and a second feed 406. The feeds 404, 406 may be coupled to a one or more receiving branches and/or one or more transmitting branches, such that the radiating element 402 can transmit or receive signals RF1 and RF2. The radiating element 402 may transmit and/or receive signals via different wireless communication technologies operating in different frequency ranges and/or via different bands of a particular wireless communication technology. In one implementation, the first feed 404 is coupled to a transmitting amplifier of a transmitting branch and the second feed 406 is coupled to a receiving amplifier of a receiving branch, such that the antenna structure 400 can transmit or receive signals RF1 and RF2 via two different feed lines. Additionally, one or more of the feeds 404, 406 can be used to both transmit and receive signals. In some implementations, one of the feeds 404, 406 is used to transmit and receive signals, while the other feed only transmits or receives signals. The radiating element 402 also includes one or more shorts 408 that provide a connection between the radiating element 402 and ground. The one or more shorts 408 may provide some impedance tuning between the antenna structure 400 and a receiving amplifier and/or a transmitting amplifier.

The antenna structure 400 also includes a number of tuning elements. The tuning elements may be coupled to the antenna structure 400 via a signal carrying line, or the tuning elements may be directly coupled to the radiating element 402. In an illustrative implementation, the tuning element A 410 is coupled to the first feed 404 and in series with a line carrying the signal RF. In another illustrative implementation, the tuning element B 412 is coupled to the first feed 404 and in parallel with a line carrying the signal RF. Further, the tuning element C 414 is coupled to the second feed 406 and in series with a line carrying the signal RF2 and the tuning element D 416 is coupled to the second feed 406 and in parallel with a line carrying the signal RF2. The tuning element E 418 is coupled to both the first feed 404 and the second feed 406. Additionally, the tuning element F 420 and the tuning element G 422 are coupled directly to the radiating element 402. In some implementations, the tuning element F 420 and the tuning element G 422 may be coupled to particular locations on the radiating element 402 to optimize the impedance matching performed by the respective tuning elements and to minimize any interference that the tuning elements 420, 422 may produce.

Figure 5:
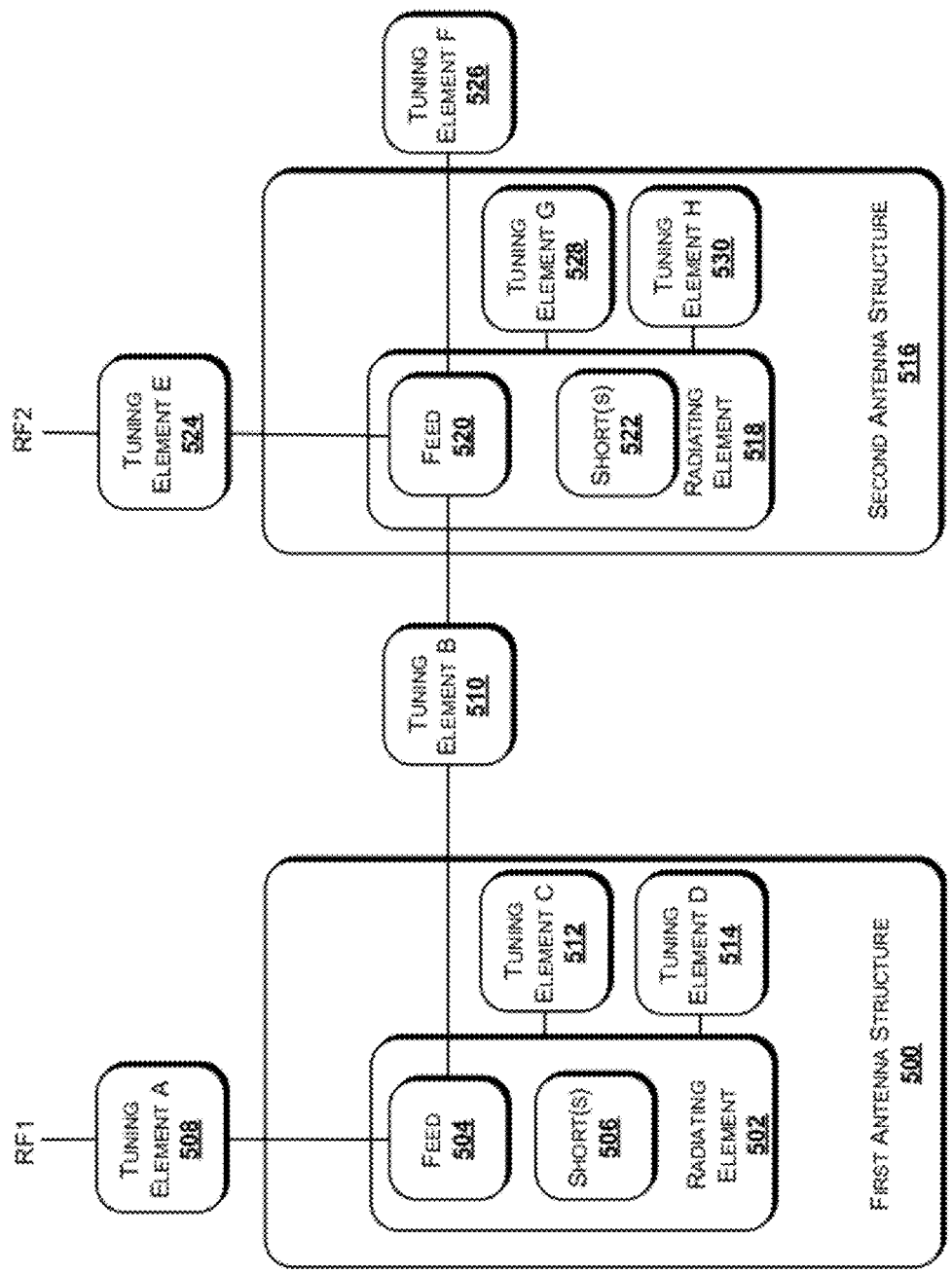
FIG. 5 shows a schematic diagram of multiple antenna structures including one feed point and a number of tuning elements.

FIG. 5 shows a schematic diagram of multiple antenna structures including one feed point and a number of tuning elements. The antenna structures may be included in a wireless communication device, such as the wireless communication device 102 of FIG. 1.

The first antenna structure 500 includes a radiating element 502 that may transmit or receive signals via one or more wireless communication technologies. Additionally, the radiating element 502 may include a feed 504. The feed 504 may be coupled to a transmitting branch or a receiving branch, such that the radiating element 502 can transmit or receive signals RF1. The radiating element 502 may transmit or receive signals via different wireless communication technologies operating in different frequency ranges and/or via different bands of a particular wireless communication technology. The radiating element 502 also includes one or more shorts 506 that provide a connection between the radiating element 502 and ground. The one or more shorts 506 may provide some impedance tuning between the first antenna structure 500 and a receiving amplifier or a transmitting amplifier.

The first antenna structure 500 also includes a number of tuning elements. The tuning elements may be coupled to the first antenna structure 500 via a signal carrying line or the tuning elements may be directly coupled to the radiating element 502. In an illustrative implementation, the tuning element A 508 is coupled to the feed 504 and in series with a line carrying the signal RF1. In another illustrative implementation, the tuning element B 510 is coupled to the feed 504 and in parallel with a line carrying the signal RF1. Additionally, the tuning element C 512 and the tuning element D 514 are coupled directly to the radiating element 502. In some implementations, tuning element C 512 and the tuning element D 514 may be coupled to particular locations on the radiating element 502 to optimize the impedance matching performed by the respective tuning elements and to minimize any interference that the tuning elements 512, 514 may produce.

A second antenna structure 516 includes a radiating element 518 that may transmit or receive signals via one or more wireless communication technologies. Additionally, the radiating element 518 may include a feed 520. The feed 520 may be coupled to a transmitting amplifier or a receiving amplifier, such that the radiating element 518 can transmit or receive signals RF2. The radiating element 518 may transmit or receive signals via different wireless communication technologies operating in different frequency ranges and/or via different bands of a particular wireless communication technology. The radiating element 518 also includes one or more shorts 506 that provide a connection between the radiating element 518 and ground. The one or more shorts 522 may provide some impedance tuning between the second antenna structure 516 and a receiving amplifier or a transmitting amplifier.

The second antenna structure 516 also includes a number of tuning elements. The tuning elements may be coupled to the second antenna structure 516 via a signal carrying line or the tuning elements may be directly coupled to the radiating element 518. In an illustrative implementation, the tuning element E 524 is coupled to the feed 520 and in series with a line carrying the signal RF2. In another illustrative implementation, the tuning element B 510 and the tuning element F 526 are coupled to the feed 520 and in parallel with a line carrying the signal RF2. In some implementations, the tuning element B 510 may include one or more parasitic elements, such as one or more passive radiating elements. Additionally, the tuning element G 528 and the tuning element H 530 are coupled directly to the radiating element 518. In some implementations, tuning element G 528 and the tuning element H 530 may be coupled to particular locations on the radiating element 518 to optimize the impedance matching performed by the respective tuning elements and to minimize any interference that the tuning elements 528, 530 may produce.

In an alternative implementation, one or both of the antenna structures 500, 516 could include two feeds similar to the antenna structure 400 of FIG. 4. In addition, the antenna structures 500, 516 could be a same type of antenna or a different type of antenna. For example, the first antenna structure 500 may be a PIFA, while the second antenna structure 516 is a FICA.

Figure 6:
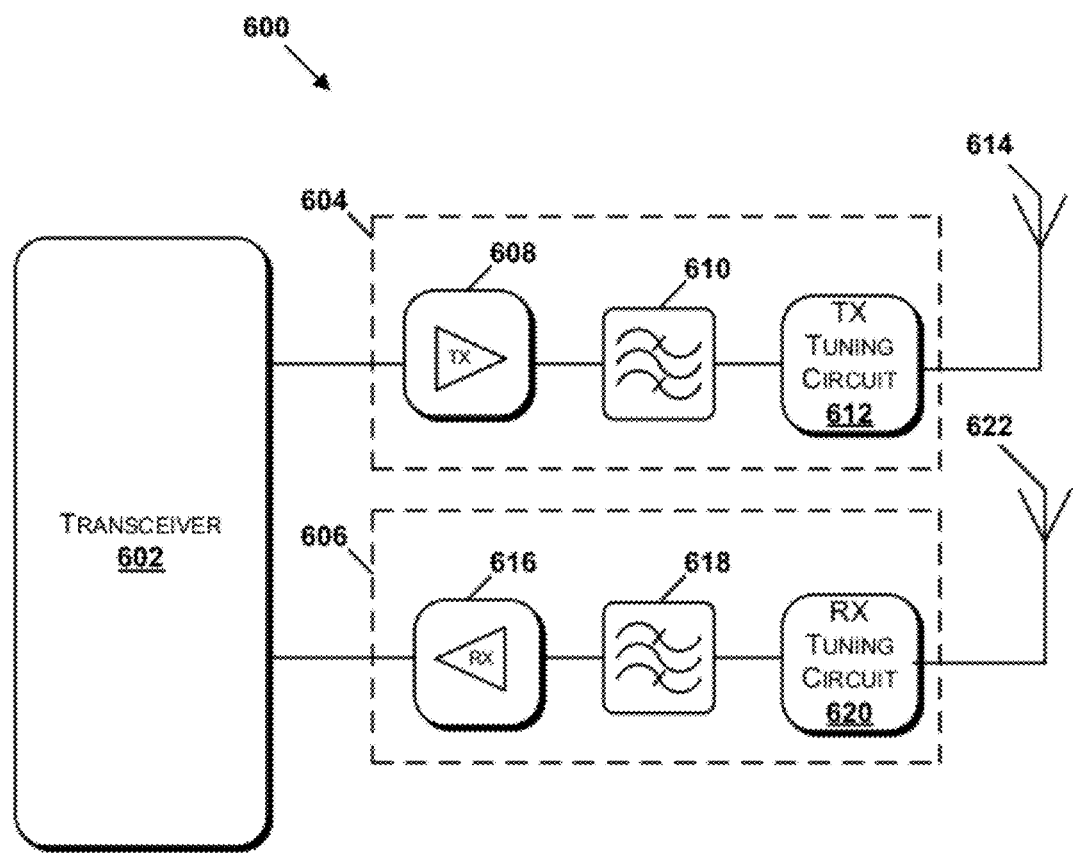
FIG. 6 shows a schematic circuit diagram of a first implementation of an exemplary architecture to provide impedance tuning of separate transmitting and receiving antennas.

FIG. 6 shows a schematic circuit diagram of a first implementation of an exemplary architecture to provide impedance tuning of separate transmitting and receiving antennas. The architecture 600 may be included in the wireless communication device 102 shown in FIG. 1.

The architecture 600 includes a transceiver 602. The architecture 600 also includes a transmitting branch 604 and a receiving branch 606. The transmitting branch 604 includes a transmitting amplifier 608. In some alternative implementations, the transmitting amplifier 608 may be a component of transmitter circuitry of the transceiver 602. The transmitting amplifier 608 may be a power amplifier. The transmitting branch 604 also includes one or more transmitting filters 610 coupled to a transmitting tuning circuit 612. Additionally, the transmitting tuning circuit 612 is coupled to a small transmitting narrowband antenna 614.

The receiving branch 606 includes a receiving amplifier 616. In some alternative implementations, the receiving amplifier 616 may be a component of receiver circuitry of the transceiver 602. The receiving amplifier 616 may be a low noise amplifier. The receiving branch 606 also includes one or more receiving filters 618 coupled to a receiving tuning circuit 620. The receiving tuning circuit 620 is coupled to a small receiving narrowband antenna 622.

In some implementations, the transmitting filters 610, the transmitting tuning circuit 612, the receiving filters 618, the receiving tuning circuit 620, or a combination thereof, may be included in the transceiver 602. Additionally, the transmitting narrowband antenna 614 and the receiving narrowband antenna 622 may include the antenna structure 200 of FIG. 2, the antenna structure 300 of FIG. 3, the antenna structure 400 of FIG. 4, or the first antenna structure 500 and the second antenna structure 518 of FIG. 5. The transmitting narrowband antenna 614 and the receiving narrowband antenna 622 may include tuning elements, such as the tuning elements 124, 126 of the antennas 120, 122 of FIG. 1, the tuning elements 208-216 of FIG. 2, the tuning elements 308-318 of FIG. 3, the tuning elements 410-422 of FIG. 4, or the tuning elements 510-516 and 526-532 of FIG. 5.

The transmitting tuning circuit 612 matches an impedance of the transmitting narrowband antenna 614 with an impedance of the one or more transmitting filters 610. Any impedance matching performed by the transmitting tuning circuit 612 can be in addition to impedance tuning performed by tuning elements of the transmitting narrowband antenna 614. In an illustrative implementation, the transmitting tuning circuit 612 receives a control signal indicating the impedance of the transmitting narrowband antenna 614 and the impedance of the transmitting filters 610. In response to receiving the control signal, the transmitting tuning circuit 612 may change state to match the impedance of the transmitting narrowband antenna 614 with the impedance of the transmitting filters 610. In some implementations, the transmitting tuning circuit 612 matches impedances of the transmitting narrowband antenna 614 with impedance of the transmitting filters 610 across a plurality of frequency ranges. The frequency ranges may be associated with transmitting bands of different wireless communication technologies. The frequency ranges may also be associated with corresponding transmitting bands of a particular wireless communication technology that has multiple transmitting bands.

Additionally, the receiving tuning circuit 620 matches an impedance of the receiving narrowband antenna 622 with an impedance of the one or more receiving filters 618. Any impedance matching performed by the receiving tuning circuit 620 can be in addition to impedance tuning performed by tuning elements of the receiving narrowband antenna 622. In some implementations, the receiving tuning circuit 620 matches impedances of the receiving narrowband antenna 622 with the impedance of the receiving filters 618 across a plurality of frequency ranges. The frequency ranges may be associated with receiving bands of different wireless communication technologies. The frequency ranges may also be associated with corresponding receiving bands of a particular wireless communication technology that has multiple receiving bands.

Some isolation between the signals of the transmitting branch 604 and the receiving branch 606 is achieved by utilizing separate antennas for transmitting and receiving signals. Additional isolation may be achieved by utilizing tunable narrowband antennas coupled to the transmitting branch 604 and the receiving branch 606. Further isolation between the transmitting branch 604 and the receiving branch 606 may be obtained when the pass band of the signals transmitted from the transmitting narrowband antenna 614 does not overlap with the pass band of signals received via the receiving narrowband antenna 622. In this way, the noise from signals of the transmitting branch 604 may become low compared to the thermal noise of the devices in the receiving branch 606. Thus, noise from the transmitting branch 604 does not significantly degrade signals in the receiving branch 606. In addition, due to the isolation between the receiving branch 604 and the transmitting branch 606 produced by utilizing the separate tunable narrowband antennas 614, 622, the filtering requirements of the transmitting filters 610 and the receiving filters 618 may be decreased. Reduced filtering requirements of the transmitting filters 610 and the receiving filters 618 decreases insertion loss and may also decrease current consumption in the transmitting branch 604 and provide better sensitivity in the receiving branch 606. In some implementations, the isolation achieved by using the separate tunable narrowband antennas 614, 622 may eliminate the need for the transmitting filters 610 and/or the receiving filters 618.

In an alternative implementation, the architecture 600 may include a single antenna coupled to both the transmitting tuning circuit 612 and the receiving tuning circuit 620, where the single antenna includes two feed points, such as the antenna structure 400 of FIG. 4. In this alternative implementation, isolation between the transmitting branch 604 and the receiving branch 606 can be obtained via the separate tunable narrowband antennas 614, 622, while further reducing the number of components required to transmit and receive signals via multiple bands.

Figure 7:
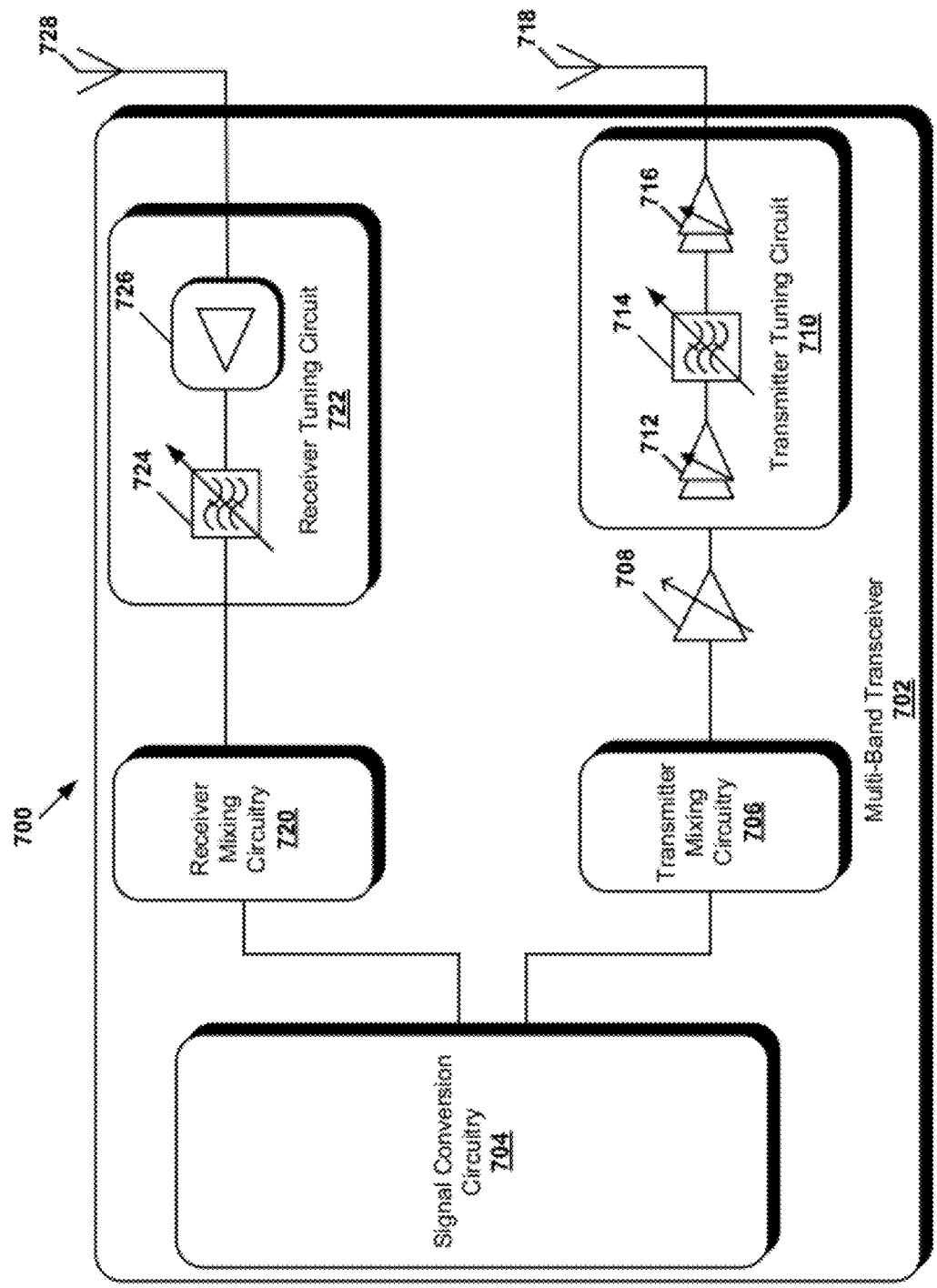
FIG. 7 shows a schematic circuit diagram of a second implementation of an exemplary architecture to provide impedance tuning of separate transmitting and receiving antennas.

FIG. 7 shows a schematic circuit diagram of a second implementation of an exemplary architecture 700 to provide impedance tuning of separate transmitting and receiving antennas. The architecture 700 includes a multi-band transceiver 702. The multi-band transceiver 702 may transmit and receive signals via a number of different frequency band pairs. For example, the multi-band transceiver 702 may process signals according to GSM, UMTS, and Bluetooth wireless technologies. In addition, the multi-band transceiver 702 may also process signals via multiple band pairs of the same wireless technology, such as the GSM 900 band pairs and the GSM 1800 band pairs.

The multi-band transceiver 702 includes signal conversion circuitry 704. The signal conversion circuitry 704 converts received analog signals to digital signals and converts signals to be transmitted via the architecture 700 to analog signals. The multi-band transceiver 702 also includes a transmitter branch including transmitter mixing circuitry 706, a first power amplifier 708, and a transmitter tuning circuit 710. The transmitter tuning circuit 710 includes a second power amplifier 712, a tunable transmitter filter 714, and a third power amplifier 716. In some implementations, the tunable transmitter filter 714 may be replaced with a filter bank and a corresponding switching mechanism to select different filters from the filter bank depending on the signals transmitted by the multi-band transceiver 702. The transmitter tuning circuit 710 is coupled to a transmitting narrowband antenna 718. The transmitting narrowband antenna 718 may include the antenna structure 200 of FIG. 2, the antenna structure 300 of FIG. 3, or the antenna structure 400 of FIG. 4. The transmitter tuning circuit 710 may also include a number of tuning elements to match the impedance of the transmitting narrowband antenna 718 with the impedance of the first power amplifier 708.

Further, the multi-band transceiver 702 also includes a receiver branch including receiver mixing circuitry 720 and a receiver tuning circuit 722. The receiver tuning circuit 722 includes a tunable receiver filter 724 and a low noise amplifier 726. In some implementations, the tunable receiver filter 724 may be replaced with a filter bank and a corresponding switching mechanism to select different filters from the filter bank depending on the signals received by the multi-band transceiver 702. The receiver tuning circuit 722 is coupled to a receiving narrowband antenna 728. The receiving narrowband antenna 728 may include the antenna structure 200 of FIG. 2, the antenna structure 300 of FIG. 3, or the antenna structure 400 of FIG. 4. The receiver tuning circuit 722 may also include a number of tuning elements to match the impedance of the receiving narrowband antenna 728 with the impedance of the low noise amplifier 726.

The architecture 700 reduces the number of components utilized in a wireless communication device including one or more multi-band transceivers. For example, the architecture 700 utilizes a single transmitter branch including the components 706, 708, and 710 and a single receiver branch including components 720 and 722 to transmit and receive signals of a multi-band transceiver 702. Thus, the architecture 700 reduces the number of components utilized to transmit and receive signals for multiple bands by performing the functions of multiple transmitter and receiver branches in a single transmitter branch and a single receiver branch. In this way, the cost of a wireless communication device decreases and current consumption also decreases. Further, the isolation required between the transmitter and receiver branches to minimize noise and interference produced by the transmission signals is achieved by utilizing separate tunable narrowband antennas for transmitting and receiving signals. Additionally, the filtering requirements of the tunable transmitter filter 714 and the tunable receiver filter 724 decrease due to the isolation achieved utilizing the architecture 700.

Figure 8:
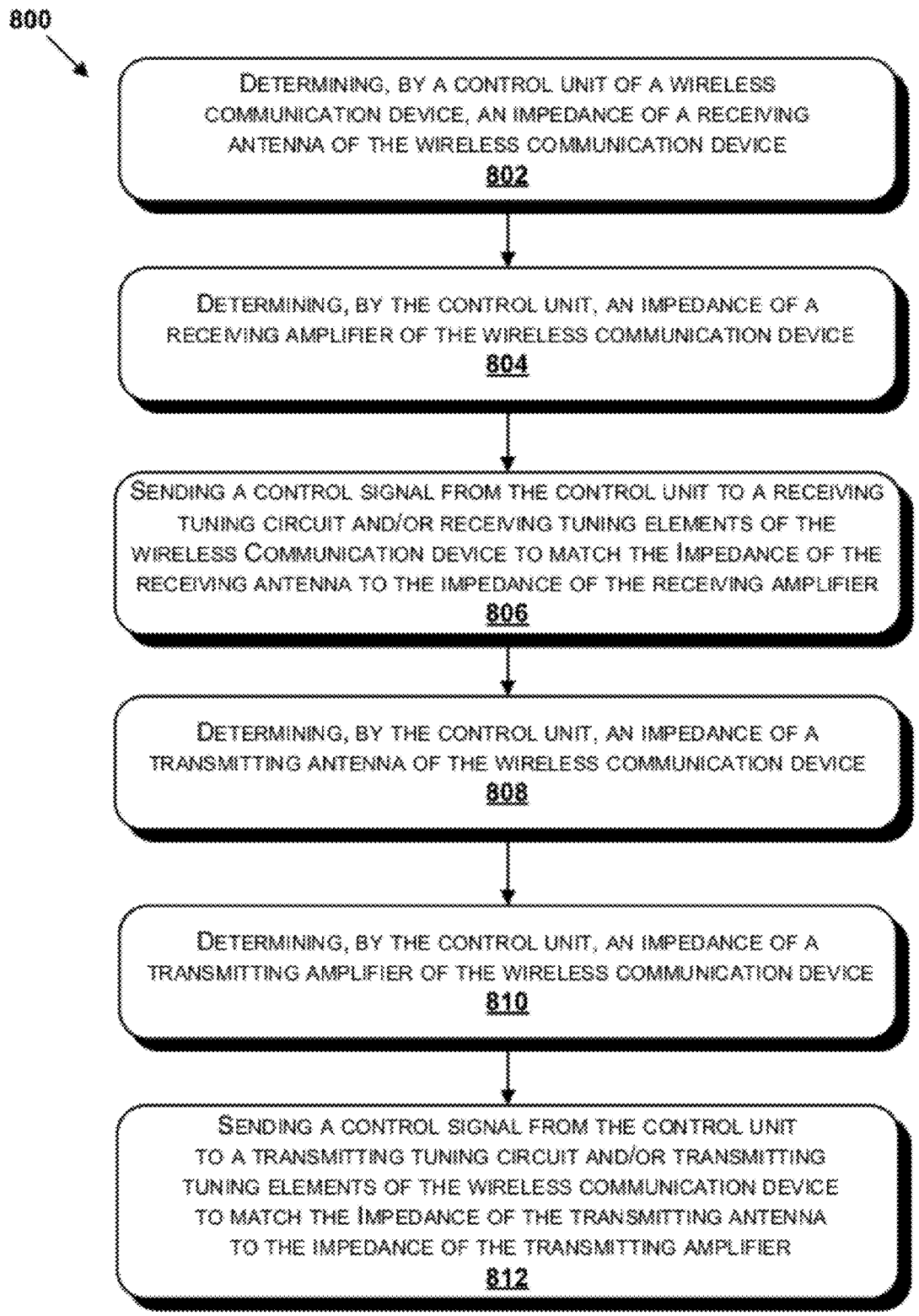
FIG. 8 shows a flowchart of a method to provide impedance tuning of an antenna dedicated to receiving signals and an antenna dedicated to transmitting signals.

FIG. 8 shows a flowchart of a method to provide impedance tuning of separate transmitting and receiving antennas. The method may be implemented utilizing the system 100 shown in FIG. 1, the architecture 600 shown in FIG. 6, and/or the architecture 700 shown in FIG. 7. Specifics of exemplary methods are described below. However, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable storage media. The computer-readable storage media can be any available media that can be accessed by a computing device to implement the instructions stored thereon.

The method 800 begins at 802 with a control unit of a wireless communication device determining an impedance of a receiving narrowband antenna of the wireless communication device. For example, the control unit may determine the impedance at an input/output node of the receiving narrowband antenna coupled to a receiving tuning circuit.

At 804, the control unit determines an impedance of an input node of a receiving amplifier of a receiving branch of the wireless communication device. In some implementations, the receiving amplifier may be included in a transceiver of the wireless communication device. The receiving amplifier may be a low noise amplifier. In addition, the impedance of the receiving amplifier may be a relatively fixed value.

At 806, the control unit sends a control signal to a receiving tuning circuit and/or receiving tuning elements of the wireless communication device to match an impedance of the receiving narrowband antenna with the impedance of the receiving amplifier. In one example, in response to the control signal, the receiving tuning circuit, the receiving tuning elements, or a combination thereof, may modify the impedance at an input node of the receiving amplifier with respect to the receiving narrowband antenna to be approximately the same as the impedance of an input/output node of the receiving narrowband antenna. In this way, the signal can be communicated from the receiving narrowband antenna to the receiving amplifier with maximum efficiency. In a particular implementation, the receiving tuning circuit and/or the receiving tuning elements operate at a particular state of a plurality of states with each state incrementally modifying the impedance of the receiving narrowband antenna with respect to the receiving amplifier in relation to other states. The state of the receiving tuning circuit or the receiving tuning elements may change based on control signals provided by the control unit.

At 808, the control unit determines an impedance of a transmitting narrowband antenna of the wireless communication device. For example, the control unit may determine the impedance at an input/output node of the transmitting narrowband antenna coupled to a transmitting tuning circuit. At 810, the control unit determines an impedance at an output node of a transmitting amplifier of a transmitting branch of the wireless communication device. In some implementations, the transmitting amplifier may be included in a transceiver of the wireless communication device. The transmitting amplifier may be a power amplifier. In addition, the impedance of the transmitting amplifier may be a relatively fixed value.

At 812, the control unit sends a control signal to a transmitting tuning circuit and/or transmitting tuning elements of the wireless communication device to match an impedance of the transmitting narrowband antenna with the impedance of the transmitting amplifier. In one example, in response to the control signal, the transmitting tuning circuit, the transmitting tuning elements, or a combination thereof, may modify the impedance at the output node of the transmitting amplifier with respect to the transmitting narrowband antenna to be approximately the same as the impedance of an input/output node of the transmitting narrowband antenna. In this way, the signal can be communicated from the transmitting narrowband antenna to the transmitting amplifier with maximum efficiency. In a particular implementation, the transmitting tuning circuit and/or the transmitting tuning elements operate at a particular state of a plurality of states with each state incrementally modifying the impedance of the transmitting narrowband antenna with respect to the transmitting amplifier in relation to other states. The state of the transmitting tuning circuit or the transmitting tuning elements may change based on control signals provided by the control unit.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A device comprising:
   a transceiver;
   a receiving narrowband antenna;
   a transmitting narrowband antenna;
   a receiving branch coupled between the transceiver and the receiving narrowband antenna, the receiving branch including a receiving tuning circuit and a first filter, and wherein the receiving tuning circuit matches an impedance of the receiving narrowband antenna with an impedance of a receiving amplifier and further matches the impedance of the receiving narrowband antenna with an impedance of the first filter;
   a transmitting branch coupled between the transceiver and the transmitting narrowband antenna, the transmitting branch including a transmitting tuning circuit and a second filter, wherein the transmitting tuning circuit matches an impedance of the transmitting narrowband antenna with an impedance of a transmitting amplifier and further matches the impedance of the transmitting narrowband antenna with an impedance of the second filter.

2. The device of claim 1, wherein the receiving amplifier and the transmitting amplifier are included in the transceiver.

3. The device of claim 1, wherein the receiving amplifier is included in the receiving branch and the transmitting amplifier is included in the transmitting branch.

4. The device of claim 1, wherein the receiving narrowband antenna, the transmitting narrowband antenna, or a combination thereof, are a planar inverted F antenna (PIFA).

5. The device of claim 1, wherein the transmitting narrowband antenna, the receiving narrowband antenna, or a combination thereof, have a building height less than or equal to 1 millimeter.

6. The device of claim 1, wherein the receiving tuning circuit matches impedances of the receiving narrowband antenna with the impedance of a receiving amplifier across a plurality of frequency ranges, wherein each frequency range is associated with a receiving band of a different wireless communication technology.

7. The device of claim 1, wherein the transmitting tuning circuit matches impedances of the transmitting narrowband antenna with the impedance of the transmitting amplifier across a plurality of frequency ranges, wherein each frequency range is associated with a transmitting band of a different wireless communication technology.

8. The device of claim 1, wherein the receiving narrowband antenna includes one or more receiving tuning elements to match an impedance of the receiving narrowband antenna with the impedance of the receiving amplifier.

9. The device of claim 1, wherein the transmitting narrowband antenna includes one or more transmitting tuning elements to match an impedance of the transmitting narrowband antenna with the impedance of the transmitting amplifier.

10. The device of claim 1, wherein the transmitting tuning circuit matches impedances of the transmitting narrowband antenna with impedances of a plurality of filters across a plurality of frequency ranges.

11. The device of claim 1, wherein the receiving tuning circuit matches impedances of the receiving narrowband antenna with impedances of a plurality of filters across a plurality of frequency ranges.

12. A method comprising:
determining, by a control unit of a wireless communication device, an impedance of a receiving narrowband antenna of the wireless communication device;
determining, by the control unit, an impedance of a receiving amplifier of the wireless communication device and an impedance of at least one receiving filter; and
sending a control signal from the control unit to a receiving tuning circuit to match the impedance of the receiving narrowband antenna with the impedance of the receiving amplifier and match the impedance of the receiving narrowband antenna with the impedance of the at least one receiving filter.

13. The method of claim 12, wherein the impedance of the receiving narrowband antenna is based on a frequency of signals received via the receiving narrowband antenna.

14. The method of claim 12, wherein the impedance of the receiving narrowband antenna is based on interaction between a user of the wireless communication device and the receiving narrowband antenna.

15. The method of claim 12 further comprising: determining, by the control unit, an impedance of a transmitting narrowband antenna of the wireless communication device; determining, by the control unit, an impedance of a transmitting amplifier of the wireless communication device; and providing a signal from the control unit to a transmitting tuning circuit to match the impedance of the transmitting narrowband antenna to the impedance of the transmitting amplifier.

16. The method of claim 15, wherein a pass band of signals that are transmitted from the transmitting narrowband antenna does not overlap with a pass band of signals that are received via the receiving narrowband antenna.

17. The method of claim 12, wherein the receiving tuning circuit is to match impedances of the receiving narrowband antenna with impedances of a plurality of filters across a plurality of frequency ranges.

18. The method of claim 12, wherein the act of sending sends the control signal to a transmitting tuning circuit to match an impedance of a transmitting narrowband antenna with an impedance of a transmitting amplifier and match the impedance of the transmitting narrowband antenna with an impedance of the at least one transmitting filter.

* * * * *